US005623981A

United States Patent [19]
Cunningham et al.

[11] Patent Number: 5,623,981
[45] Date of Patent: Apr. 29, 1997

[54] SAFETY BARRIER FOR RIM HOLDING TIRE CHANGERS

[75] Inventors: Charles L. Cunningham, Nashville; Robert E. Gwaltney, Brentwood; Ronald D. Hone, Fairview, all of Tenn.

[73] Assignee: Service Station Products Company, Lavergne, Tenn.

[21] Appl. No.: 516,129

[22] Filed: Aug. 17, 1995

[51] Int. Cl.⁶ ................................................ B60C 25/00
[52] U.S. Cl. ................................................ 157/1; 157/1.1
[58] Field of Search .................................... 157/1, 1.1

[56] References Cited

U.S. PATENT DOCUMENTS

| | | | |
|---|---|---|---|
| D. 293,916 | 1/1988 | Cunningham et al. | D15/199 |
| 4,381,027 | 4/1983 | Molen et al. | 157/1 |
| 4,742,859 | 5/1988 | Mannen | 157/1 |
| 4,765,387 | 8/1988 | Mannen | 157/1 |
| 4,809,759 | 3/1989 | Dale et al. | 157/1.1 |
| 4,811,774 | 3/1989 | Dale et al. | 157/1.1 |
| 4,840,215 | 6/1989 | Vijay et al. | 157/1 |
| 4,865,104 | 9/1989 | Mannen | 157/1 |

Primary Examiner—James G. Smith
Attorney, Agent, or Firm—Waddey & Patterson; I. C. Waddey, Jr.

[57] ABSTRACT

A safety device which can be retrofitted onto existing rim holding tire changers or provided as a feature of such devices by the original equipment manufacturer. Applicant's safety feature is a barrier, in the preferred embodiment a U-shaped steel tube approximately 18" across and 5' in height, mounted to the tower of the device. The actuator for applying pressure during the bead seating process (and during the inflation process) consists of two buttons on the opposite side of the barrier from the table top on which the tire and rim sit during the process. To actuate the pressure during the bead seating step of the process, both buttons must be depressed. This requires that the operator uses both hands to actuate the system. Also, the actuator being located on the opposite side of the barrier from the table top requires the operator the walk behind the barrier in order to actuate this step of the process. In addition, being required to use both hands to apply the pressure, the operator cannot reach his head over the table top to see if the bead has been seated. Thus, in order to operate the system, the operator is removed from the potential explosion area during the application of the pressure that would cause the explosion and is behind the barrier that will protect him from the effects of the explosion.

9 Claims, 8 Drawing Sheets

SAFETY BARRIER FOR RIM HOLDING TIRE CHANGERS

BACKGROUND OF THE INVENTION

The present invention relates generally to rim holding tire changers and more particularly to a safety device for use in connection with rim holding tire changers.

It will be appreciated by those skilled in the art of designing and manufacturing equipment used to change the tubeless tires mounted on the rims of cars, trucks and other vehicles that if such equipment is not used correctly and in accordance with instruction, tires can explode and create personal injury and property damage. Manufacturers of such equipment have for years attempted to address this problem with instruction, training manuals, warning decals and hands-on training on their equipment in an attempt to prevent hazards associated with improper use of their equipment. However, not withstanding the efforts made by manufacturers of such equipment to warn and train users, shop mechanics often ignore the training and warnings and use the equipment in a manner contrary to the instructions of the manufacturer. Occasionally, when the rim holding tire changers are used improperly, the results can be catastrophic—an exploded tubeless radial tire that can cause severe personal injury and even death.

The type of equipment for which Applicant's invention is designed is known generally in the industry as a rim holding tire changer and examples of the type of equipment involved are the rim holding tire changers manufactured by Hennessy Industries, Inc., Applicant's assignee, and marketed under the trademarks "COATS®" and "AMMCO®" including the COATS® models 5030A and the model 5060A-E and 5060AX-EX. However, there are many manufacturers of such equipment, including FMC Corporation of Chicago, Ill., Corghi of Correggio, Italy and Sice of Correggio, Italy. Equipment of this type has been readily available in the market for many years, is the subject matter of numerous patents and has been described in a variety of publications, bulletins, brochures, operating and instruction manuals, and the like. One such machine is illustrated in the design patent issued to Applicant as co-inventor in U.S. Design Pat. No. 293,916.

The misuse of rim holding tire changers occurs in spite of and irrespective of the bold warnings and extensive educational and training efforts of the manufacturers of these products. When accidents occur, lawsuits generally follow and regardless of the efforts of the manufacturers to train users of their equipment in the proper use of rim holding tire changers, the cost of defending such claims can be enormous. In addition, there have been some occasions where damages have been awarded under products liability theories on the basis that the manufacturer of the equipment could have "done more" to protect the user of the equipment against injury.

In order to answer the claim that they should have "done more" to protect the users of their equipment, manufacturers have resorted to a number of safety devices, in addition to the warnings about proper use of their equipment. The safety devices that have been adopted by manufacturers over the years to address the problem of "exploding" tires includes, for example, the enclosure type devices described in U.S. Pat. Nos. 4,840,215; 4,865,104; and 4,811,774, all assigned to FMC Corporation of Chicago, Ill.

The problem with the prior art efforts at "doing something more" in attempting to provide greater safety features in the rim holding tire changing industry is that it is difficult to get the user of the equipment to actually employ the safety devices. In many instances, the mechanic will simply side step the safety measure and proceed with the tire changing process without employing the safety devices built into the equipment.

Figure 1:
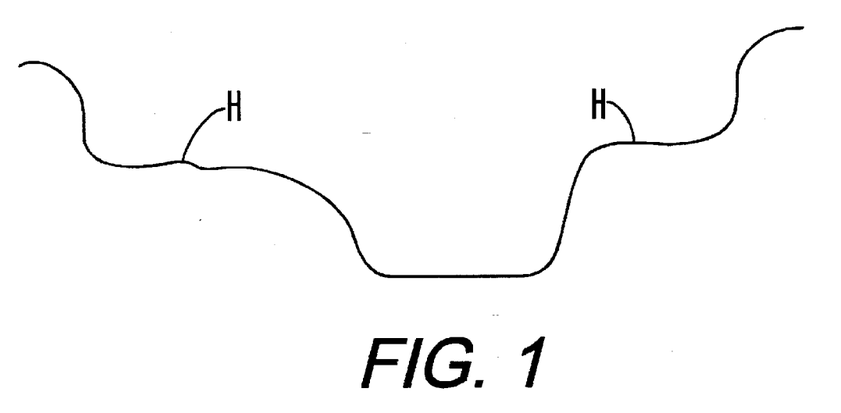
FIG. 1 illustrates a standard Tire and Rim Association, Inc. rim contour.

The particular safety problem involved generally arises during the bead seating step of the tire changing process or in those occasions where there are mismatched tires and wheels. In the automobile industry in the U.S., practically all rim contours conformed to standards established by the Tire and Rim Association, Inc. FIG. 1 illustrates generally a rim contour for a 5° drop center rim for 14", 15", 16", 17" and 18" diameter tire designations and is referred to generally as the J(ISO) contour. Under the rim contour as is illustrated in FIG. 1, there is an annular hump H which serves as a safety feature to keep the inner perimeter of the tire from slipping into the drop center of the rim during certain operations of the vehicle. The hump H, which is employed in the majority of modern rim contours, creates a problem in the mounting of a new tire since the bead of the tire must ride over the hump and the outside diameter of the hump is greater than the inside diameter of the tire. To deal with this problem in the tire mounting process, the bead of the tire must first be sealed against the hump in order to fill the chamber of the tire with compressed air. As compressed air is injected into the chamber, the bead will ride over the hump H and seat against the "j" contour of the perimeter of the rim. After the bead is properly seated, the tire can be inflated to the recommended pressure and the rim is ready to be attached to the hub of the car.

The danger occurs when the bead binds against the hump and does not ride over it to seat against the rim. When this happens, contrary to instructions and warnings, mechanics tend to continue to force compressed air into the tire chamber far beyond the recommended pressure of approximately 40 psi for a standard automobile fire. As the pressure within the chamber builds up, the mechanic often will peer over the tire to see if the bead has seated against the rim. When the bead actually does ride over the hump, the pressure within the chamber of the tire will cause the bead to accelerate at a tremendous rate and be impelled against the rim. The force of the bead against the rim can cause the tire and/or the rim to explode and if the mechanic is peering over the tire, the explosion occurs in his face and can cause tremendous injury or death.

The other occasion which can create the type of problem discussed above is when a mechanic attempts to mount a mis-matched tire/rim combination.

Automobile tires are generally mounted on even sized wheels of 14", 15", 16", 17", etc. The automobile industry for a number of years used half-sized rims on small trucks such as pick-up trucks. Thus, the trucks would have rim diameters of 16.5", 17.5", etc. In the early 1980's, 16" tires on pick-up trucks became popular and the 16.5" tires lost favor because of extra expense, etc. However, in the older pick-up trucks, the customer would have a 16.5" rim and when he took his pick-up truck by a tire dealer to have a new set of fires mounted on his truck, occasionally a mechanic would pull a 16" tire from inventory and attempt to mount a 16" tire on a 16.5" rim (the 16" tire on a 16.5" rim is the predominant problem of mismatched tires although the problem could occur in other sized rim/tire combinations such as the attempt to mount a 17" tire on a 17.5" rim, etc.). Mounting an even sized tire on a half-sized wheel simply is not possible. The bead of a 16" tire will not seat properly on a 16.5" rim or wheel, and continuing to apply compressed air into the chamber of a tire will eventually result in an explosion of the tire or the tire and the wheel. If the mechanic is peering over the tire to see if the bead is properly seated, he will in all likelihood be severely injured.

In a number of rim holding tire changers currently on the market, foot pedals are used to apply air pressure within the chamber of a tire that is being mounted on a rim. When the bead is being sealed against the hump, the first foot pedal or the initial depression of a foot pedal will cause compressed air to flow through the valve in the rim. Modern rim holding tire changers also include table top jets which blast air at approximately 140 psi from the table top to create an air curtain which aids in the bead sealing. At this stage in the process, approximately 10 psi air pressure within the tire chamber is the maximum recommended pressure. Generally, the tire will contain about ½ to 2 psi of air pressure when the bead seal is obtained.

Once bead sealing is achieved, the second foot pedal is depressed or a single foot pedal is depressed to a second stage so that air is injected into the tire chamber. Since the bead is now sealed against the hump, there is no need for air pressure through the table top jets so at the second step of process, the only air pressure to the tire is the air to seat the bead against the rim through the valve in the rim. Bead seating will usually require at least 7 psi in the tire, but 40 psi is the maximum safe pressure at this stage regardless of tire operating pressure.

At the bead seating stage of the process, since the foot pedal for introducing pressure into the chamber of the tire is directly at the base of the tire changer, it is possible for the mechanic to peer over the top of the tire while he depresses the foot pedal and forces additional air pressure within the chamber which, if the tire explodes while he is looking at the bead, could result in personal injury.

SUMMARY OF THE INVENTION

Applicant's invention is a safety device which can be retrofitted onto existing rim holding tire changers or provided as a feature of such devices by the original equipment manufacturer. Applicant's safety feature is a barrier, in the preferred embodiment a U-shaped steel tube approximately 18" across and 5' in height, mounted to the tower of the device. The actuator for applying pressure during the bead seating process (and during the inflation process) consists of two buttons on the opposite side of the barrier from the table top on which the tire and rim sit during the process. To actuate the pressure during the bead seating step of the process, both buttons must be depressed. This requires that the operator uses both hands to actuate the system. Also, the actuator being located on the opposite side of the barrier from the table top requires the operator the walk behind the barrier in order to actuate this step of the process. In addition, being required to use both hands to apply the pressure, the operator cannot reach his head over the table top to see if the bead has been seated. Thus, in order to operate the system, the operator is removed from the potential explosion area during the application of the pressure that would cause the explosion and is behind the barrier that will protect him from the effects of the explosion.

DESCRIPTION OF THE PREFERRED EMBODIMENT

Applicant's invention will be best understood when considered in light of the following description of the preferred embodiment of the invention, as illustrated in FIGS. 3–7 of the attached drawings wherein like reference numerals refer to like parts.

Figure 2:
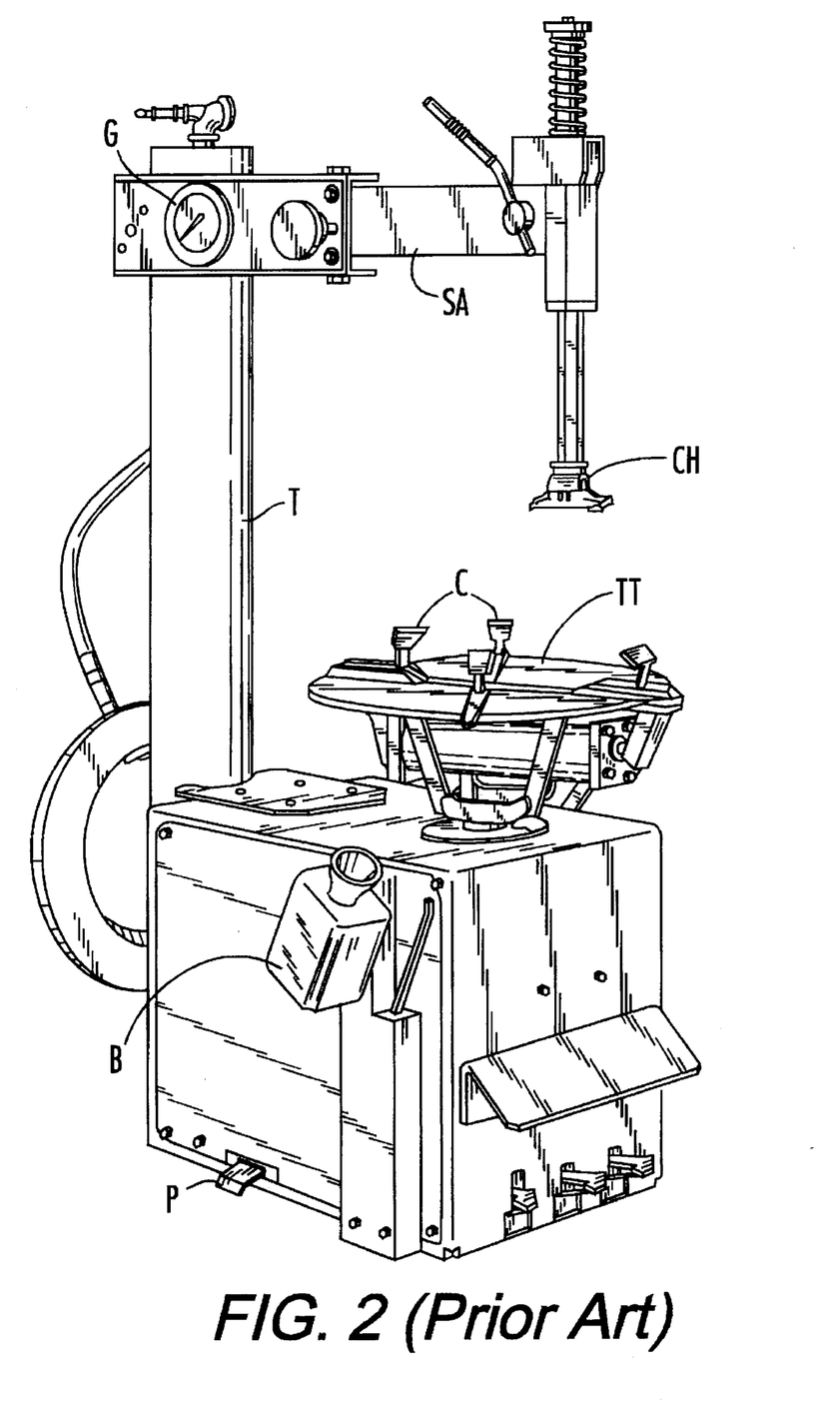
FIG. 2 is a perspective view of a prior art rim holding tire changer.

FIG. 2 of the attached drawings show a prior art rim holding tire changer. The prior art device includes a tower T, an air gauge G, an inflation pedal P, a table top TT, clamps C, a lube bottle B, a combination mount/demount head CH, and a swing arm SA.

Figure 3:
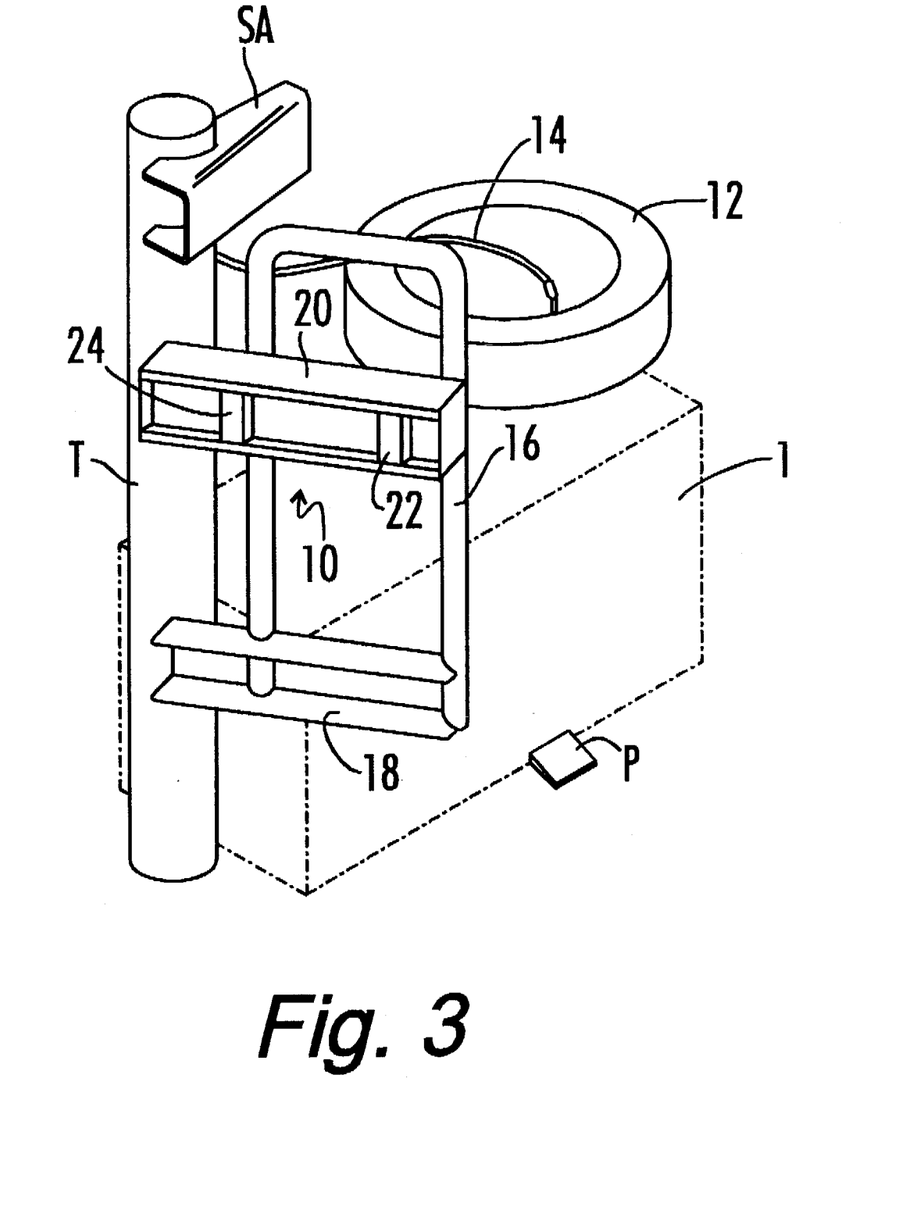
FIG. 3 is a schematic perspective view of the safety barrier of Applicant's invention attached to a standard rim holding tire changer.
Figure 4:
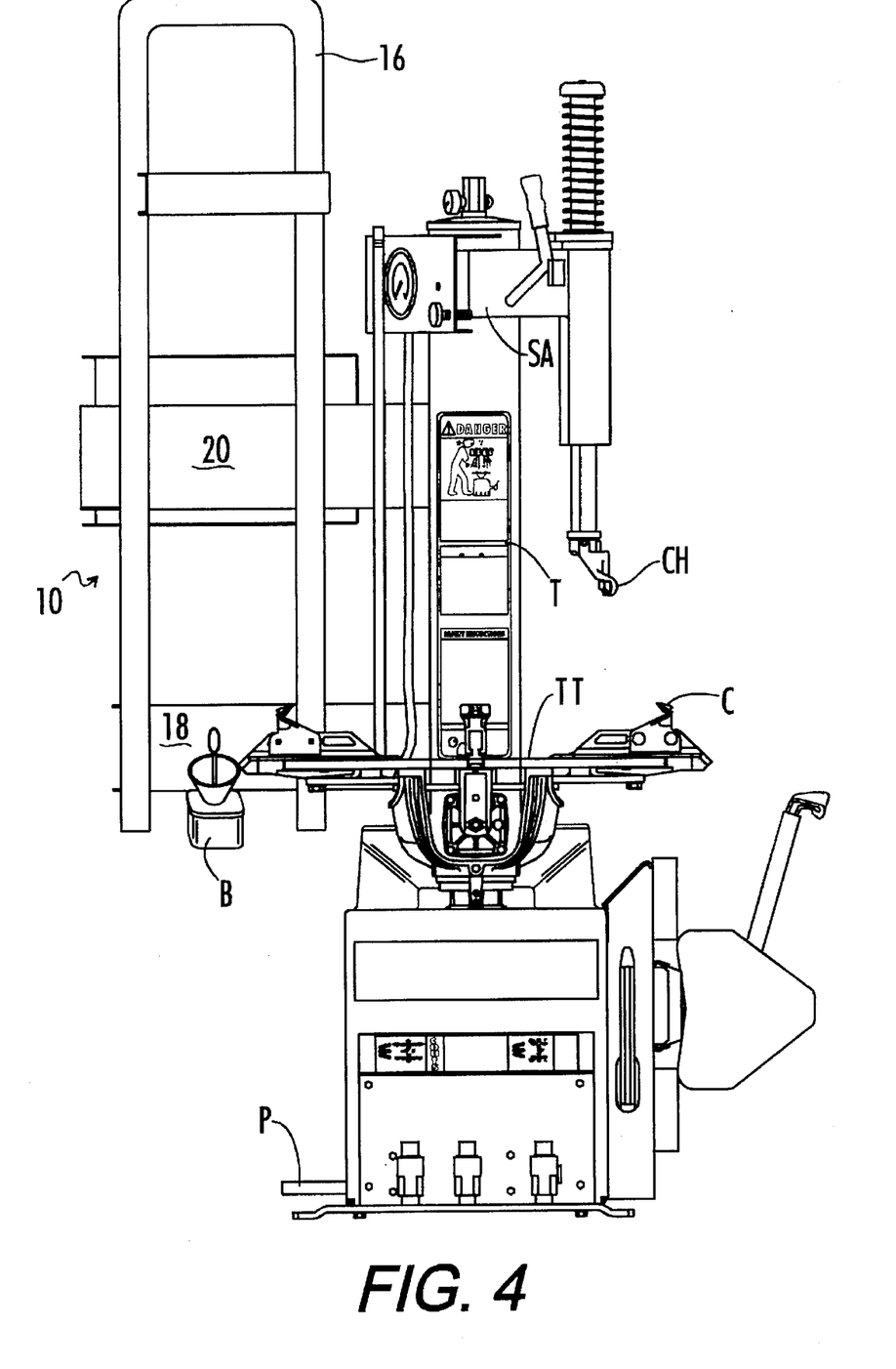
FIG. 4 is a front view of a rim holding tire changer having Applicant's safety barrier attached and looking in the direction of arrow 4 shown on FIG. 7.
Figure 5:
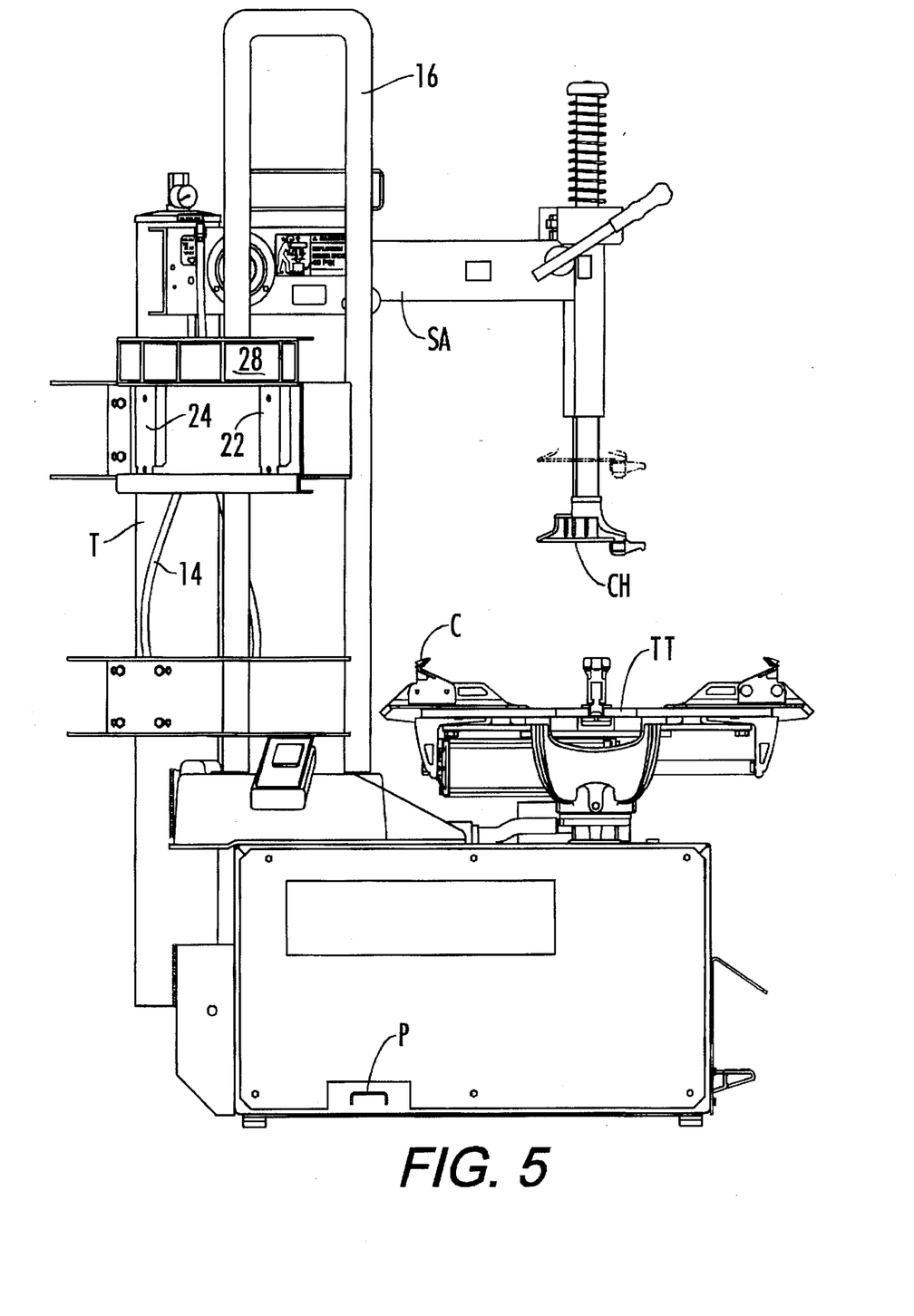
FIG. 5 is a side view of a prior art rim holding tire changer with Applicant's safety barrier attached and looking in the direction of arrow 5 of FIG. 7.
Figure 6:
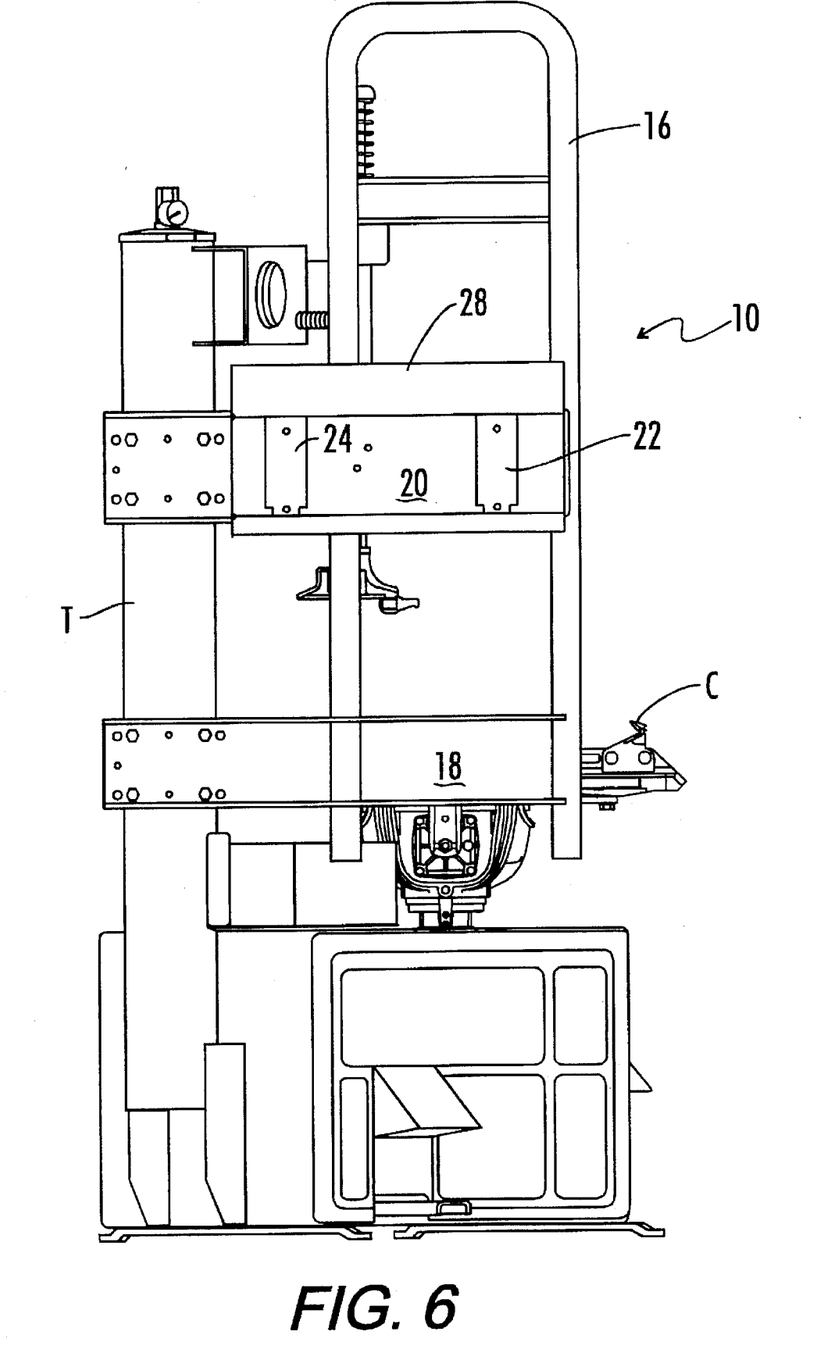
FIG. 6 is a view looking straight on from the rear of the safety barrier as it is attached to a standard rim holding tire changer, looking in the direction of arrow 6 in FIG. 7.

Applicant's invention 10 is illustrated schematically and in perspective in FIG. 3 and mounted on a rim holding tire changer structure. The safety barrier of Applicant's invention is preferably mounted on the tower T between the swing arm SA and the floor on which the tire changer sits. The tire changer structure is shown schematically as a box 1 since the details of the particular tire changer to which Applicant's invention is applied are not particularly significant to Applicant's invention.

A tire 12 would be mounted on the table of the rim holding tire changer 1 and held in place by clamps provided on the table. An air pressure hose 14 is provided to inflate the tire as it is mounted on a rim in the normal course of the tire changing process.

Referring still to FIG. 3, the safety barrier of Applicant's invention includes a barrier means which, in the preferred embodiment, consists of an inverted U-shaped steel pipe 16 mounted to the tower T by mounting means which, in the preferred embodiment, consist of arms 18 and 20.

The arms 18 and 20 can be welded to the tower T or they can be bolted to the tower. As a retrofit structure for existing rim holding tire changers, the arms 18, 20 can be bolted to the tower T or can be attached to it by any other convenient attachment mechanisms. The arms 18 and 20 are preferably made of steel or some other material able to resist heavy force and impact and can be constructed in a box-type structure, something in the nature of a box beam or a U-shaped beam in order to provide additional strength and to facilitate the attachment of the inverted U-shaped member 16 to the arms 18, 20. The inverted U-shaped member 16 is welded or bolted to the arms 18, 20, securely attaching the inverted U-shaped structure to the arms.

There are two air pressure actuators 22 and 24 which must be depressed in order to open a valve which allows air pressure from a main air supply to pass through the air pressure holes 14 and into the tire 12. Thus, in its simplest form, in order to seat the bead of the tire on the rim, once the bead has been sealed against the hump H of a rim, the operator must walk away from the tire to a point behind the safety barrier and depress both valves 22 and 24 (which are separated apart a sufficient space so that they cannot be depressed by one hand). By this mechanism, if the operator wants to see if the bead has been seated, he must walk from behind the safety barrier, releasing the pressure off of the actuators 22, 24 so that the air pressure into the tire ceases. He can then look at the bead to see if it is seated and if it is not, in order to apply more pressure, he must walk behind the safety barrier and depress both actuators 22 and 24 in order to apply full pressure to the fire. By this arrangement, if the operator exceeds the recommended pressure being applied to the tire and if the tire does propel the bead over the hump H and into impact with the rim and cause an explosion, the operator will be behind the safety barrier and generally protected from injury by the structure of the safety barrier.

Referring in some additional detail to FIGS. 4–8, as can be seen from these figures, Applicant's safety barrier 10 is attached to a rim holding tire changer of a type that is readily available in the open market. In tire changers of the type illustrated, the pedal P can be depressed part way and at a point of partial depression, compressed air will be forced through hose 14 and in addition, approximately 140 psi of air pressure is projected through the air jets 26 (see FIG. 7). The air passing through the air jets 26 creates an air curtain which enables the bead to seal against the hump H. Since the air pressure from the main air supply feeds both the air pressure hose 14 and the jets 26, once the bead is sealed against the hump H, very little air pressure continues to flow through the hose 14 because, following the path of least resistance, the air will exit the jets 26 primarily, the air jets being directed to the atmosphere as compared to the air that is passing through the air pressure hose 14 which is being directed into the chamber within the tire that is mounted on the rim. Since the chamber is a sealed cavity, the air passing through the hose 14 will meet resistance and very little of the air coming from the main power supply will pass into that chamber as opposed to the volume of air passing through the jets 26 into the atmosphere.

In a standard procedure, once the bead is sealed against the hump H, the pedal P would be pressed to a second position which would shut off the air flowing to the jets 26 and would only supply air pressure through the hose 14. Air passing exclusively through the hose 14 would pass into the chamber of the tire and in the normal course of events would cause the bead of the tire to pass over the hump and seat against the rim.

In Applicant's invention, the pedal P is only effective to activate air from the main air supply over a dual path to the jets 26 and through the valve 14 into the tire. Thus, once the bead is sealed against the hump H, the tire will generally not inflate to cause the bead to seat or if it were to do so, it would take such a long time to accomplish that result that the mechanic would become frustrated. The extra time associated with trying to cause the bead to seat against the rim by forcing air into the chamber of the tire through the depression of the pedal P would cause the operator to want to activate the air exclusively through hose 14 into the tire through the use of the valves 22, 24. By depressing actuators 22, 24, the air from the main air supply goes directly into the chamber of the tire and will cause it to fill much faster than would occur if the filling was attempted by activating the pedal P.

In operation, the benefits of Applicant's invention occur because the mechanic cannot reach the actuators 22, 24 and still peer over the tire mounted on the table top TT. In order to depress the actuators 22, 24, the mechanic would have to walk behind the safety barrier 10 and place one hand on the actuator 22 and the other hand on the actuator 24. In that position, the mechanic is protected from any explosion from the tire that might occur on the table TT. To prevent the mechanic from attempting to reach through the U-shaped steel tubing 16, a plate 28 is mounted between the arm 20 and the U-shaped member 16. The plate 28 makes it practically impossible for the operator to reach over or under the plate and get his hands on the actuators 22, 24 and to press them and still be on the table top TT side of the barrier 10.

Figure 7:
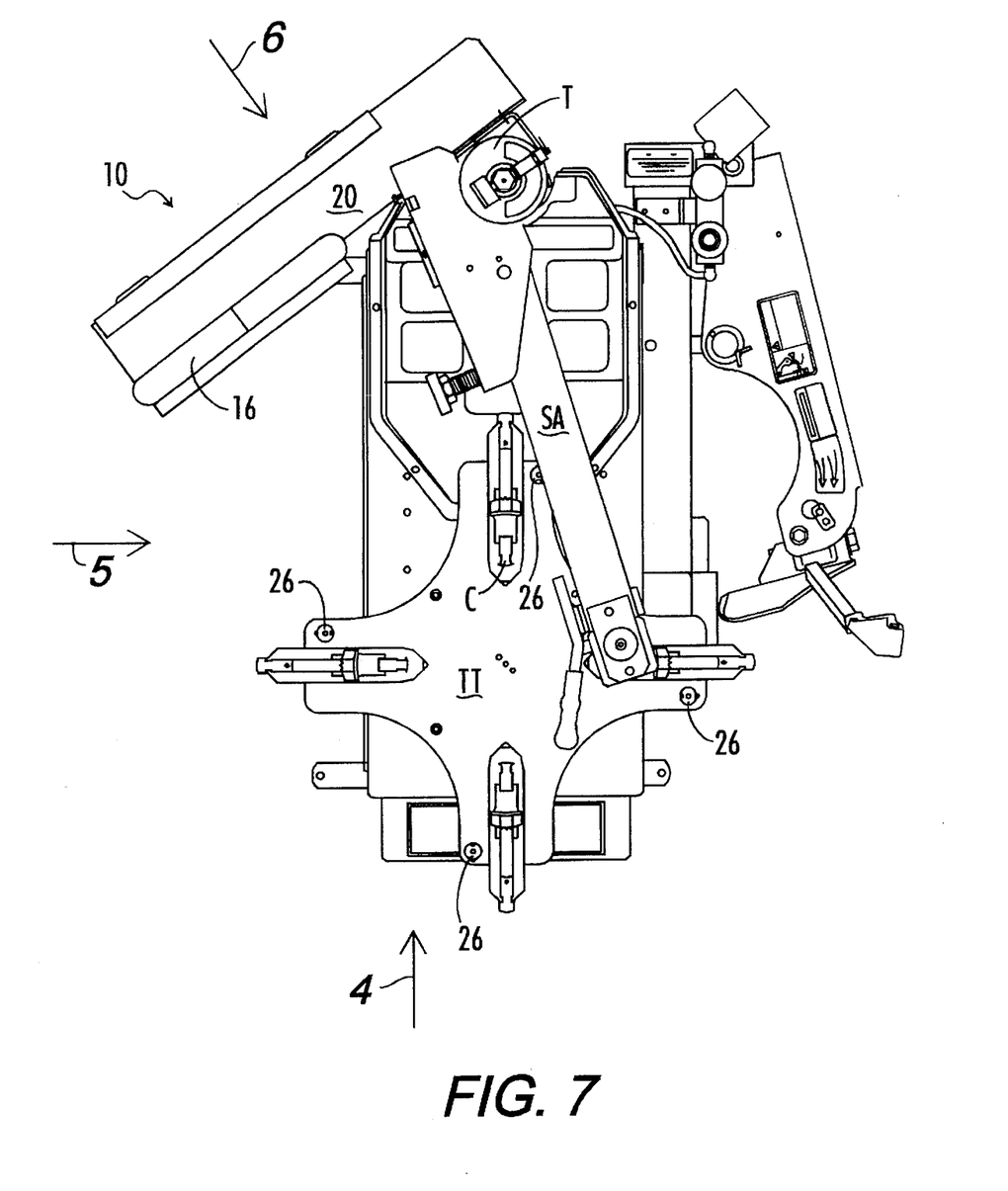
FIG. 7 is a top view of a standard rim holding tire changer with Applicant's safety barrier attached.

As can be seen from FIG. 7, the angle of the mounting of the safety device 10 onto the tower T is convenient for the operator to walk behind the safety barrier to depress the actuators 22, 24 without significant inconvenience and yet the safety barrier 10 is sufficiently removed from the table top TT so that the operator could not reach through or over the barrier to depress the actuators 22, 24 while remaining on the table top side of the system.

Figure 8:
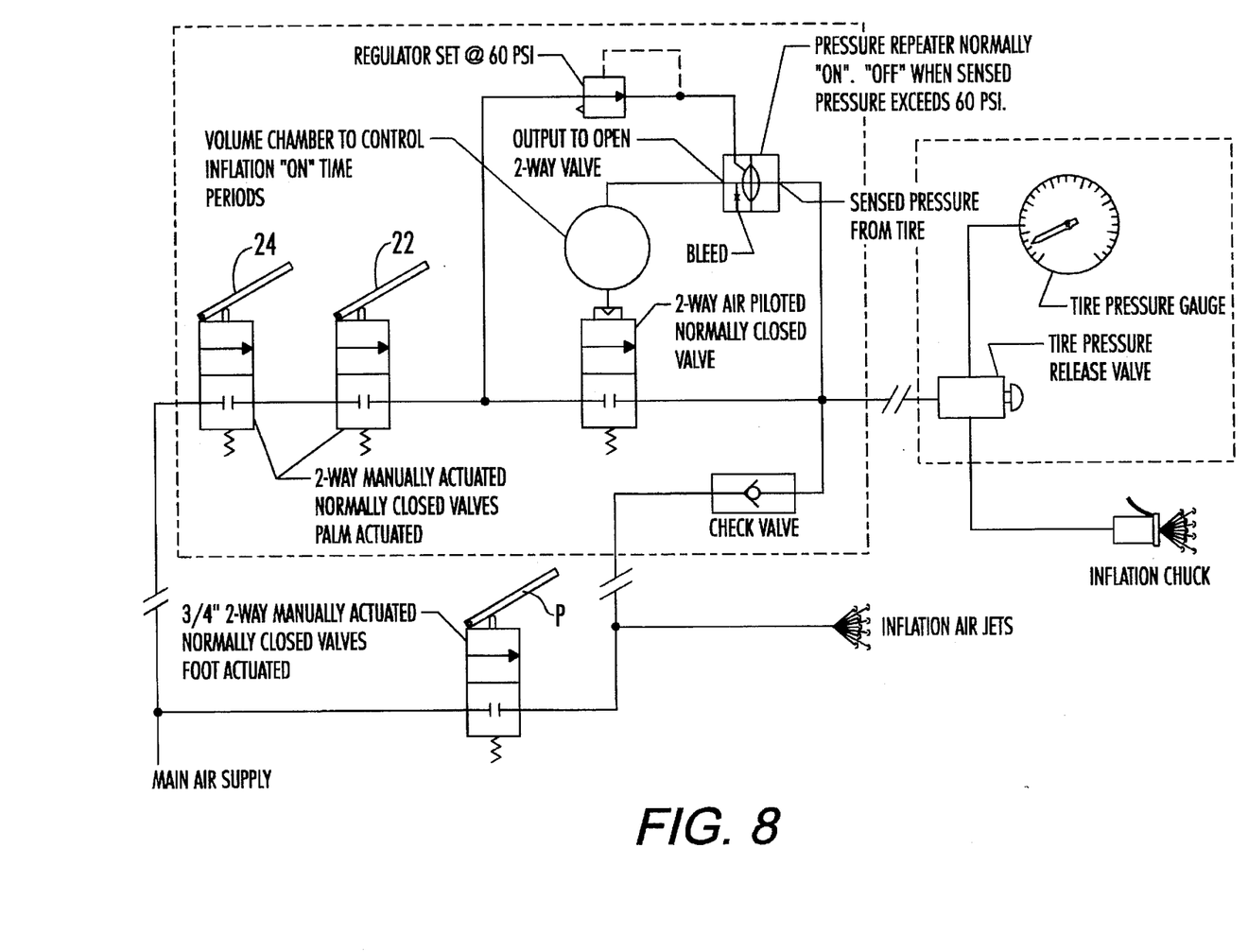
FIG. 8 is a schematic of an air pressure control system of Applicant's invention.

FIG. 8 illustrates in schematic diagram the pneumatic valve and air pressure system of the present invention showing the two actuators 22, 24 in the supply line from the main air supply to the tire, all of which is designed to protect the operator from an exploding tire and require that he be on the opposite side of the safety barrier from the tire when the tire is being inflated or when the bead is being seated in the mounting process.

Thus, although there have been described particular embodiments of the present invention of a new and useful safety barrier for rim holding changers, it is not intended that such references be construed as limitations upon the scope of this invention except as set forth in the following claims. Further, although there have been described certain dimensions used in the preferred embodiment, it is not intended that such dimensions be construed as limitations upon the scope of this invention except as set forth in the following claims.

What I claim is:

1. A safety device for a tire changer including a table on which a rim can be mounted and clamped into place while a tire is mounted on the rim, said tire changer including an air pressure source and means for controlling the flow of air pressure from said air pressure source to a chamber created between a tire and the contour of a rim mounted on said table, the safety device including barrier means for protecting an operator from explosion of a tire, an actuating station including said air pressure flow controlling means, and means for mounting said barrier means relative to said tire changer between said actuating station and said table.

2. The device of claim 1 wherein the air pressure flow controlling means is mounted on said barrier means.

3. The device of claim 1 wherein said air pressure flow controlling means is spaced more than an operator's arm's length from a tire and rim mounted on said table.

4. The device of claim 1 wherein the barrier means is spaced from said table a sufficient distance that an operator cannot peer over said table while activating the air pressure flow controlling means.

5. The device of claim 1 wherein the barrier means is a vertically positioned, U-shaped beam.

6. The device of claim 1 wherein the tire changer includes a tower and the barrier means is mounted to said tower.

7. The device of claim 1 wherein the air pressure flow controlling means includes two actuators spaced apart sufficiently that they cannot be actuated with one hand.

8. The device of claim 1 wherein the air pressure flow controlling means requires two hands to operate.

9. The device of claim 1 wherein said barrier has two sides, one side facing said table and the other side facing away from said table, and said air pressure flow controlling means cannot be actuated by an operator when the operator is on the one side.

* * * * *